Dec. 30, 1969  D. A. KELLY  3,486,487
HIGH COMPRESSION RADIAL/ROTARY I.C. ENGINE
Filed March 25, 1968  3 Sheets-Sheet 1

INVENTOR.
Donald A Kelly

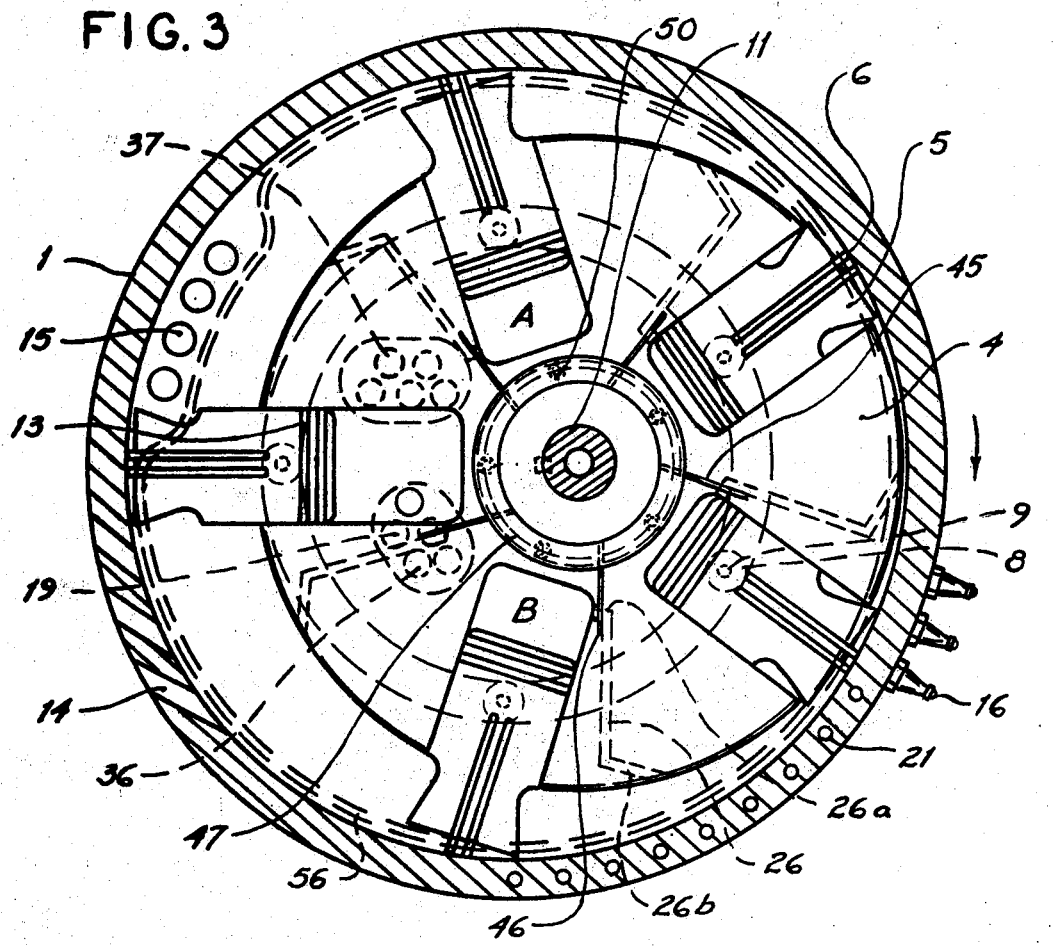

Dec. 30, 1969   D. A. KELLY   3,486,487
HIGH COMPRESSION RADIAL/ROTARY I.C. ENGINE
Filed March 25, 1968   3 Sheets-Sheet 3

INVENTOR.
Donald A. Kelly

_3,486,487_
**HIGH COMPRESSION RADIAL/ROTARY
I.C. ENGINE**
Donald A. Kelly, 58—06 69th Place,
Maspeth, N.Y. 11378
Filed Mar. 25, 1968, Ser. No. 715,707
Int. Cl. F02b 53/00
U.S. Cl. 123—16                    6 Claims

ABSTRACT OF THE DISCLOSURE

A radial/rotary I.C. engine comprising multiple large volume piston/vanes fitted into an eccentric rotor. The amount of eccentricity is the maximum possible, consistent with adequate side support of the piston/vanes within the rotor slots, and rotor integrity.

The arrangement is adopted to provide a maximum compression ratio possible for both the rotary vane section and the radial pistons.

A dual mode of operation may be utilized in which the compression piston pressures are transferred to the rotor periphery for a torsional jet effect. The pressure flow control gates would be actuated externally by an air pressure means.

---

This invention relates to a high compression radial/rotary internal combustion engine of the piston/vane type, in which the rotary power vanes also function as radial pistons to provide augmented torque at low speeds for reaching a full useful range of engine operation.

This radial/rotary is a variation of the previously disclosed multiple piston/vane rotary engines in that the compression ratios of both the rotary section and the radial pistons are proportionately increased by increasing the eccentricity or offset distance to an optimum value.

Since the engine is equipped with a dual ignition system, one for the rotary section and the other for the radial piston ignition, either or both sets of plugs may be fired to meet varying operating conditions.

The primary objective of most current rotary engine effort is to obtain high compression ratios at a minimum of sealing friction, so that the highest possible operating efficiencies will be reached. The currently operational rotary engines exhibit a "turbining" effect with their best output obtained at relatively high r.p.m.'s, and with the torque curve falling off rapidly at lower speeds. Most of the current I.C. rotary engines provide efficient vane sealing in order to obtain high compression ratios, but in so doing inherit some seal wear and lubrication problems.

Since this new rotary engine provides good low speed torque performance many new applications are opened up including all types of automotive uses. An advantage to good low speed torque performance is that only a small gear reduction unit is necessary with greaer speed response available at lower speeds.

The high compression radial/rotary engine is foreseen as attractive for a wide scope of applications, because of its full range of torque and speed capability, including light aircraft. It is expected that very high power-to-weight ratios will be achieved when all components are optimized so that heretofore doubtful or marginal applications will be made possible.

This radial/rotary engine relies on high speed baffling and close clearance seals to reach a trade off between eliminating seal wear and obtaining a fairly high compression ratio in the rotary section. The multiple piston/vanes are fitted with Teflon or Viton interlocking sealing strips which are proportioned to contain the pressure of the compressing air volume. The end plate inner faces form the sealing sides for the rotor slots with the rotor fitting closely between the end plate faces, so that there is a minimum or no pressure loss in operation.

Annular sealing rings may be included within the rotor end surfaces to maintain a complete and effective cross sealing means.

The engine may be arranged to operate in dual mode by providing radial transfer bores in the rotor disposed from the base of the piston bores to the periphery of the rotor. This arrangement would allow the compressing air volume under the radial piston to transmit this pressure to the rotor periphery to provide a torsional jet effect. A flow control gate would intersect the transfer bores near the piston bases and allow the passage or blockage of pressure, depending on the desired operating characteristics for the engine at the time. The flow control gates would be axially actuated by external air pressure which contacts an annular ring connecting one end of all the flow control gates.

The annular ring would be of small diameter and recessed into a corresponding groove within the rotor. This annular ring would be uniformly spring-loaded laterally toward the end plate so that the air pressure maintains constant contact with the annular ring. The flow control gates would normally close off the transfer bores with the annular ring in the up or outermost position, and when air pressure presses down or inward the flow control gates will open the transfer bores and allow the transfer of piston pressure to the rotor periphery.

The design utilizes simple geometric shapes and since the output shaft is concentric with the rotor, manufacturing costs can be kept relatively low. The engines does not require expensively formed components and makes use of a maximum of simple machine parts wherever possible.

It is likely that the radial/rotary I.C. engine can be evolved to exceed the high power-to-weight ratios of the current gas turbines in its class, and exceed the economy of the C.I. engines in its class, at lower initial and operating costs.

The rotary portion of the engine is cooled in the conventional manner with external coolant jackets and by parallel coolant flow in the ignition area of the cylindrical housing. The internally operating piston/vanes present a difficult cooling problem which must be handled by combined liquid and forced air cooling. The top and bottom coolant jackets provide cooling for the end areas of the piston/vanes, while the internal cavities within the rotor provide an air cooling effect for the sides of the piston/vanes.

The rotary section will be provided with axially cooling holes within the cylindrical housing walls in the combustion area. These holes will be closely spaced for efficiency and the resulting parallel coolant flow will assure adequate heat transfer. Corresponding in-line holes will be located in the end plates, with gaskets providing the seal, so that the coolant flows through the entire engine width at the combustion area. The coolant jackets mounted at the top and bottom of the engine will also aid in the adequate cooling of the radial pistons.

The following proportions for this radial/rotary engine will govern the high compression feature in both engine sections and the optimum operating characteristics.

The ratio of the rotor diameter to the inside diameter of the cylinder housing should be 5 to 6 with a tolerance of ±.10.

The ratio of the piston/vane length to the rotor diameter should be 1.5 to 5 with a tolerance of ±.10.

The ratio of the piston/vane width to the rotor diameter should be 1 to 6 with a tolerance of ±.15.

It should be noted that the rotor to cylinder diameter ratio determines the amount of eccentricity or offset of the rotor and primarily governs the rotary section compression ratio.

The piston/vane length to rotor diameter ratio determines the critical amount of piston/vane side guidance within the rotor slot and partly determines the compression ratio in the radial piston section of the engine.

The piston/vane width along with its length and slot depth determine the compression ratio in the radial piston section of the engine.

The base of the rotor slots is provided with generous radii in order to aid in maintaining rotor strength and integrity. The ratio of the base radii should be not less than ⅕ the width of the rotor slots with a tolerance of +.03 −0.

The piston/vanes must also have a matching radii at their lower ends of not less than ⅛ the width of the piston/vane with a tolerance of +.02 −0.

Lubrication of the internal piston/vanes will be accomplished by the use of an oil-in-fuel mixture along with a forced oil supply arrangement as a stand-by system.

In the rotary section complete combustion within the compressed instant cavities will be achieved by the use of multiple spark plugs over the entire combustion area. In addition to raising the operating efficiency of the engine complete combustion will lower the noxious and toxic level of the exhaust in support of current anti-air pollution programs.

The piston/vanes are restrained radially by ball bearings which run in circular grooves in the end plates. The ball bearings are secured to the piston/vane sides which revolve in these circular grooves and assure that each piston/vane radial sweep position is in constant close relationship to the cylinder bore and thereby assure that there is no radial load imposed on the top of the seal strips.

The piston/vane radial position is set so that the top seal strips run at .001 to .005 clearance inch to the cylinder bore. The rolling contact of the bearings with the outside diameter of the grooves is adjustable so that the aforementioned clearance is maintained. These ball bearings are subjected to high radial loading and high speeds and will require meeting rigid standards.

The piston/vanes in this radial/rotary engine are wider than in any previously disclosed designs, so that an optimum compression volume can be attained.

In order to maintain rotor integrity near the hub, the piston/vanes and cavities may be shaped to provide the necessary strength and rigidity. Five piston/vanes appear to be a suitable number, since an adequate displacement volume is achieved in both the rotary section and the radial cavities.

The interlocking sealing strips are fitted into corresponding grooves in the top and along the sides of the piston/vanes. These sealing strips of Teflon or Viton are provided with precision half-laps at each end, so that they closely match an adjacent strip at right angles.

The multiple piston/vanes are fitted into close corresponding slots in the rotor and thereby guided in their radial displacement as the rotor revolves. The depth of the rotor slot is based on the piston/vanes being fully retracted into them at the combustion or flush position with a slight clearance provided at the bottom of the vanes.

The rotor of the engines must be hollow or built up of plates and sectors to keep the overall weight of the engine within acceptable limits.

The principal object of the invention is to provide a maximum compression ratio in both the rotary and the radial section of a radial/rotary I.C. engine.

It is an object of the invention to produce a radial/rotary I.C. engine with a maximum displacement volume in both the rotary and radial sections.

It is an object of the invention to produce a rotary I.C. engine with the highest possible power-to-weight ratio at the lowest possible cost.

It is an object of the invention to produce a simple rotary engine with a small number of operating parts for ease of production, replacement and maintenance.

It is a final object of the invention to construct a rotary I.C. engine which achieves maximum possible combustion within the combustion cavities to reduce to a minimum the noxious and toxic level of the exhaust gases.

Other features and arrangements of the engine will become apparent from the following description of this radial/rotary I.C. engine. It should be understood that variations may be made in the detail engine design without departing from the spirit and scope of the invention.

In the accompanying drawings:

FIGURE 3 is an alternate top section view of the engine.

FIGURE 4 is a side section view of the engine showing control gate actuation.

Figure 1:
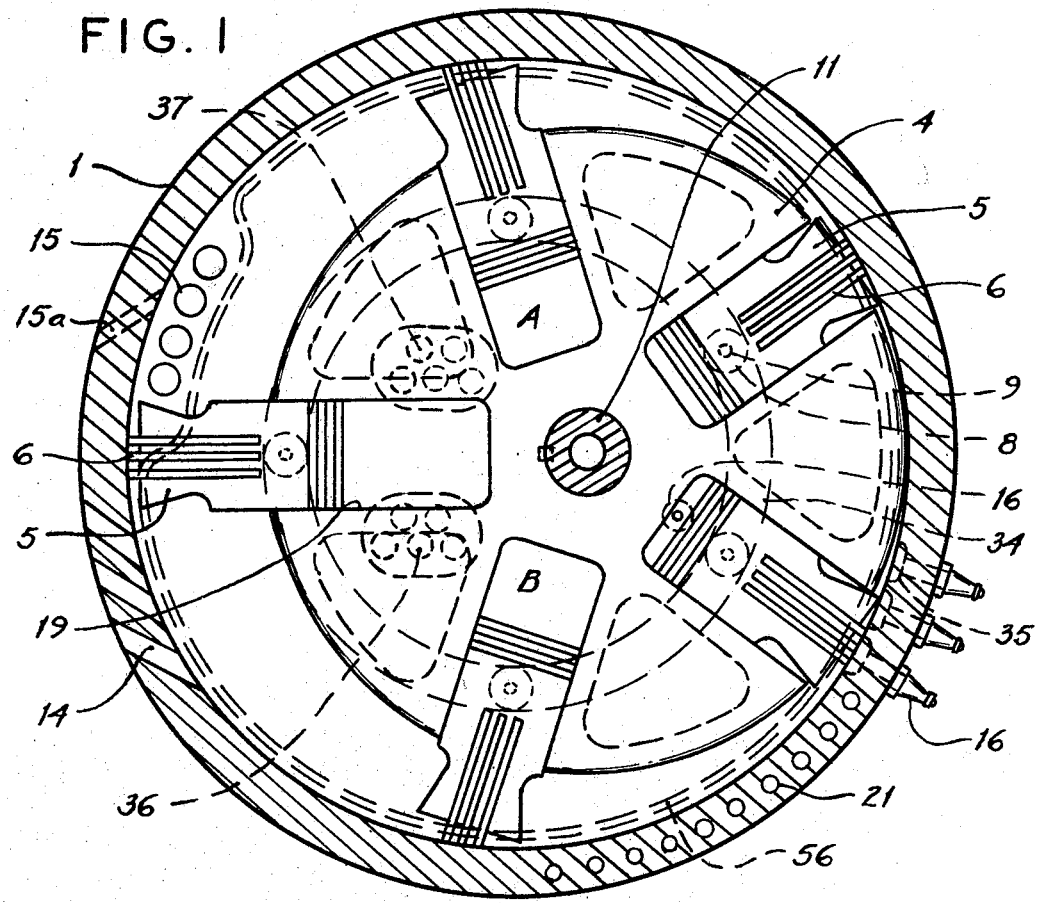
FIGURE 1 is a top sectional view of the high compression radial/rotary engine.
Figure 2:
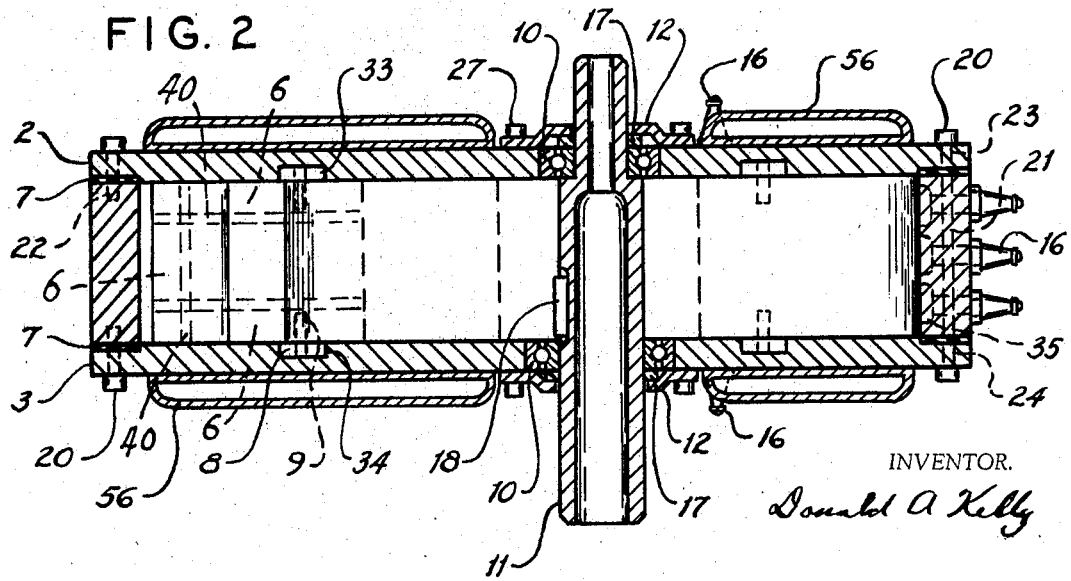
FIGURE 2 is a side sectional view of the high compression radial/rotary engine.
Figure 5:
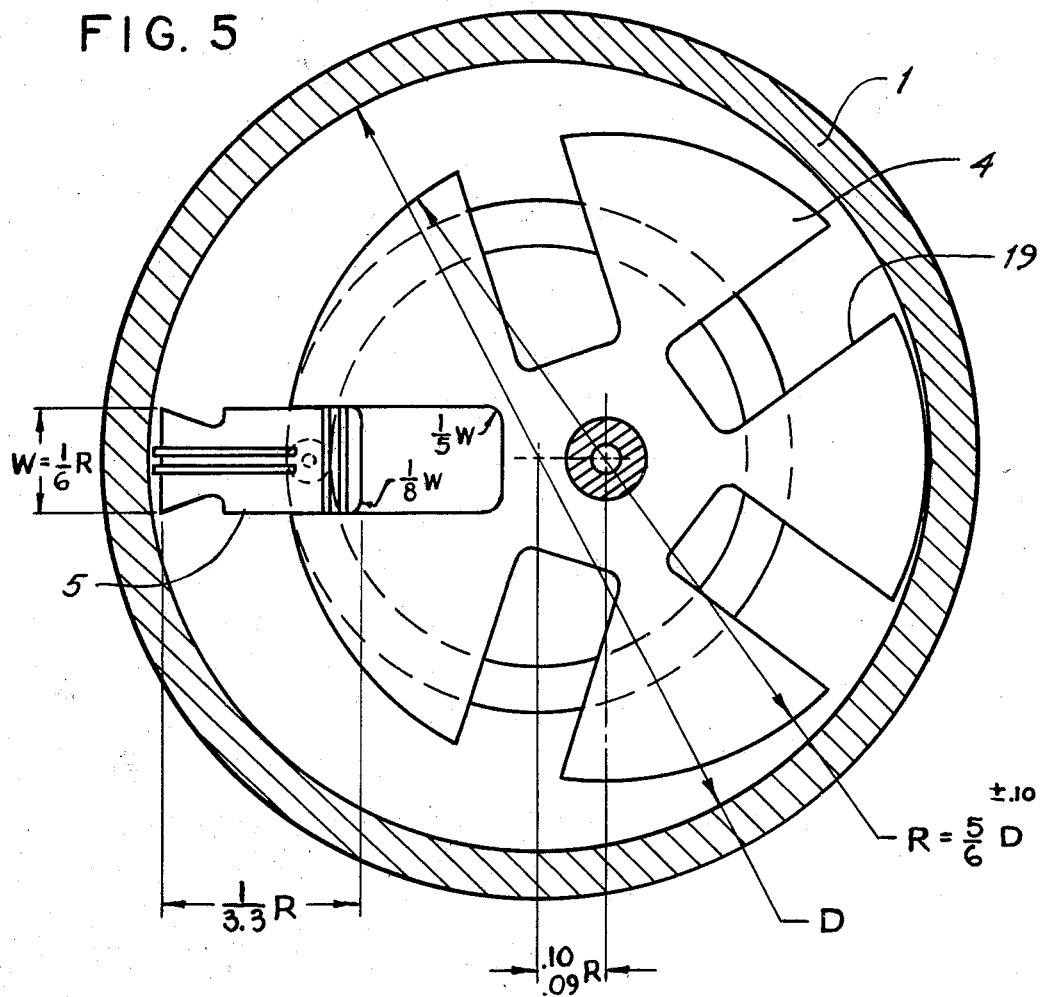
FIGURE 5 is a top schematic view showing the limits of the rotor offset.
Figure 6:
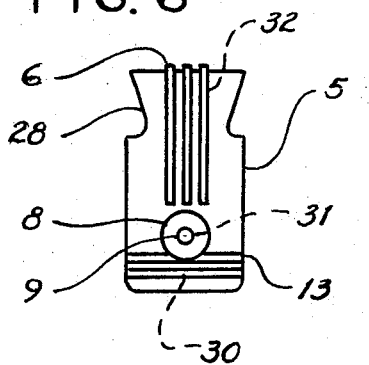
FIGURE 6 is a top view of a typical piston/vane.
Figure 7:
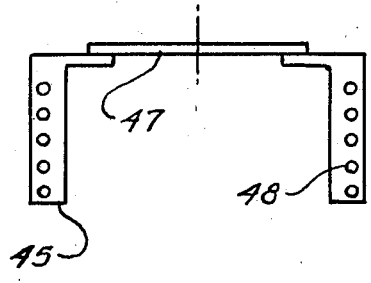
FIGURE 7 is an elevation view of the flow control gates and annular ring.

Referring now in more detail to the accompanying drawings, number 1 is the cylindrical housing. The cylindrical housing 1 contains the coolant holes 21 and the mounting tapped holes 22. The two end plates 2 and 3 are secured to the cylindrical housing 1 by the machine screws 20. The end plates 2 and 3 contain the coolant holes 23 and 24 respectively. The gaskets 7 provide a pressure seal and coolant seal between the cylindrical housing 1 and the end plates 2 and 3.

The slotted rotor 4 is offset within the cylindrical housing 1 bore and supported by the drive shaft 11. The drive shaft 11 is free to revolve within the two tapered roller bearings 10, fitted within the end plates 2 and 3. The two retainers 12 are secured to the end plates 2 and 3 with the screws 27, which retain the shaft seals 17 in place to keep foreign material from entering the engine at these points.

The rectangular key 18 secures the rotor 4 to the shaft 11 both radially and axially. The wide multiple piston/vanes 5 are closely fitted within the wide rotor slots 19, with both provided with a machine finish of RMS 8 or better. The piston/vane 5 height exactly matches the rotor 4 height and both are closely fitted within the cylindrical housing 1 and the end plates 2 and 3 when assembled.

The piston/vanes 5 are provided with two or more sealing grooves 30 in which the rectangular sealing strips 13, closely fit. The piston/vanes 5 are provided with baffling notches 28, at their upper vane positions, and two pin holes 31 at each lower piston portion side. The retaining pins 9 support the ball bearings 8 and are tightly fitted into the pin holes 31.

The ball bearings 8 are closely fitted within the circular grooves 33 and 34, which are concentrically machined into the inside faces of the end plates 2 and 3 and which serve to guide and limit the piston/vane 5 radial displacement and insure that the vane tips and seals clear the cylindrical housing 1 bore by from .001 to .005 inch.

The vane portion of the piston/vanes 5 is provided with multiple rectangular grooves 32 centrally located along the top and two sides and continuing to about the midpoint of the piston/vane height. The multiple interlocking sealing strips 6 are closely fitted into these rectangular grooves 32 and provide the pressure sealing for the vane portion in the rotary mode of operation.

The rectangular sealing strips 6 are made with precision half-lap and cut so that they interlock at right angles with the adjacent sealing strip thereby forming a close sealing fit within the piston/vane 5. These sealing strips 6 must be spring-loaded with wave type spring strips 40, so that the seals will maintain the proper sealing distance from the cylinder housing 1 walls.

The rectangular piston portion sealing strips 13 are made with precision half-lap and cuts so that they interlock at right angles with the adjacent sealing strip and thereby form a continuous seal around the piston portion of the piston/vanes. The sealing strips may also be spring loaded with wave type spring strips if necessary.

One version of the rotor 4 design would include radial transfer bores 26 for producing a jet effect at the rotor periphery. The transfer bores 26 are disposed from the base of the piston bores 19, to the periphery of the rotor 4, with the necessary offsets intersecting the radial bore as shown. The base offset 26a provides a means of intersection for the flow control gates 45 which are connected to the annular ring 47. The peripherial offsets 26b intersect the radial transfer bores 26 near the rotor periphery and provide the directional or torsional thrust effect for the rotors.

The gate slot 46 intersects the base offset 26a in which the flow control gate 45 slides and limits its radial movement. The flow control gate 45 is provided with multiple holes 48 which line up with the multiple base offsets 26a when the annular ring 47 and connected control gates 45 are pressed down or axially inward.

The annular ring 47 fits into a corresponding circular groove 49 machined into the rotor 4 side. Multiple springs 50 recessed into the groove 49 bear against the inside of the annular ring so that the ring is forced upwards, with the base offsets 26a closed off.

An annular groove 51 is provided on the inside face of the end plate 2 into which the annular ring 47 is closely fitted. A small air tube 52 is fitted into the end plate 2 and connects the annular groove 51 to an external air source such as the compressing air volume of the radial pistons, which can be remotely controlled.

In operation, when it is desired to transfer pressure from the radial pistons 5 to the rotor periphery such as in high speed operation, the air pressure is applied on the annular ring 47 which causes the flow control gates 45 to open the radial transfer bores 26.

The cylindrical housing 1 is provided with multiple spark plugs 16, which are uniformly mounted over the combustion cavity at an angle of from 20 to 30 degrees off side dead center in either direction of rotation, as required. The cylindrical housing 1 bore is provided with combustion cavities 35 which nest the spark plug electrodes and aid in swirling the fuel/air mixture during combustion.

Both the rotor 4 faces and the inside surfaces of the end plates 2 and 3 are provided with a machine finish at RMS 16 or better, and are treated with a low friction film.

The cylindrical housing 1 has multiple exhaust ports 14 tangentially disposed at the side of the housing approximately 130 degrees, mean angle from the spark plugs mean center, to carry out the exhaust gases after the power phase is complete. Axial intake ports 15 are placed in either or both of the end plates 2 and 3 approximately opposite from the center of the spark plug array.

Intake ports 15a may be tangentially located within the cylindrical housing for some applications where priming and supercharging are desirable.

Intake ports 37 are located in either or both of the end plates 2 and/or 3, at about the same angular position as the intake ports 15, but positioned over the lower piston portion intake cavity area A.

Exhaust ports 36 are located in both end plates 2 and 3, at about the same angular position as the exhaust ports 14, but positioned over the lower piston portion exhaust cavity area B.

Liquid coolant jackets 56 are mounted on the end plates, 2 and 3.

The end plates 2 and 3 are fitted with spark plugs 16, at the same mean angular location as the spark plugs 16, fitted in the cylindrical housing 1, but located over piston combustion cavities.

Mounting of the engine would be accomplished by utilizing the outer surface of the bottom end plate 3, and securing the engine to the mounting means with some of the multiple screws 20.

The distributor system, which is not shown nor described for clarity, would be divided into two sections which would synchronize both radial and rotary spark plug groups, and would allow either one or the other group of plugs to function independently or together.

Most of the accessory units necessary for the operation of a standard I.C. reciprocating engine, such as fuel supply exhaust systems and similar units, would be applicable to the radial/rotary I.C. engine and are not shown for the sake of clarity.

What is claimed is:

1. In a rotary internal combustion engine, a cylindrical housing, a circular cavity within said cylindrical housing, a multiple slotted rotor at .010 to .025 inch clearance at one point of said cavity, multiple radially disposed wide radial/rotary vanes closely fitted within the slots of the said slotted rotor, multiple generally radially disposed small bores located between the base of the slots of said slotted rotor and the periphery of the rotor flow control gates intersecting said small bores near the base of the slots of said slotted rotor, an annular ring joining all of the flow control gates at one side, two end plates secured at the top and bottom of the said cylindrical housing, sealing and spacing means disposed between the said cylindrical housing and end plates, exhaust ports tangentially disposed at one side of an exhaust cavity, exhaust ports axially disposed near the center of said two end plates, intake ports axially disposed adjacent to the exhaust ports within the said two end plates, a drive shaft secured to the said slotted rotor, bearing means within said end plates supporting said drive shaft, multiple radially disposed spark plugs secured to the outside of the cylindrical housing, multiple axially disposed spark plugs secured to the said two end plates.

2. The combination set forth in claim 1 including an annular groove provided in the inside face of one of the said two end plates, an axial tube disposed within the said end plate connecting the annular groove with an external air compressing means.

3. The combination set forth in claim 1 wherein the said multiple radially disposed wide radial/rotary vanes are provided with baffling notches at their upper end at both sides.

4. The combination set forth in claim 1 wherein the width of the said multiple radially disposed wide radial/rotary vanes is equal to not less than one-sixth of the said multiple slotted rotor diameters.

5. In a rotary internal combustion engine, a cylindrical housing, a circular cavity within said cylindrical housing, a multiple slotted rotor at .005 to .010 inch clearance at one point of said cavity, the ratio of the slotted rotor diameter to the circular cavity of the said cylindrical housing is 5 to 6, multiple radially disposed wide radial/rotary vanes closely fitted within the slots of the said slotted rotor, the ratio of the said multiple radially disposed wide radial/rotary vane height to the said slotted rotor diameter is 1½ to 5, two end plates secured at the top and bottom of the said cylindrical housing, sealing and spacing means disposed between the said cylindrical housing and end plates, exhaust ports tangentially disposed at one side of an exhaust cavity, exhaust ports axially disposed near the center of said two end plates, intake ports axially disposed adjacent to the exhaust ports within the two end plates, a drive shaft secured to the said slotted rotor, bearing means within said end plates supporting said drive shaft, multiple radially disposed spark plugs secured to the outside of the cylindrical housing, multiple axially disposed spark plugs secured to the said two end plates.

6. In a rotary internal combustion engine, a cylindrical housing, a circular cavity within said cylindrical housing, a multiple slotted rotor at .003 to .015 inch clearance at one point of said cavity, the slots of the said multiple slotted rotor are provided with radii at the base equal to not less than one-fifth the width of the said multiple sloted rotor slots, the said multiple radially disposed wide radial/rotary vanes are provided with near matching radii equal to not less than one-eighth the width of the radial/rotary vanes, two end plates secured at the top and bottom of the said cylindrical housing, sealing and spacing means disposed between the said cylindrical housing and end plates, exhaust ports tangentially disposed at one side of an exhaust cavity, exhaust ports axially disposed near the center of said two end plates, intake ports axially disposed adjacent to the exhaust ports within the two end plates, a drive shaft secured to the said slotted rotor, bearing means within said two end plates supporting said drive shaft, multiple radially disposed spark plugs secured to the outside of the cylindrical housing, multiple axially disposed spark plugs secured to the said two end plates.

References Cited

UNITED STATES PATENTS

| | | | |
|---|---|---|---|
| 2,298,525 | 10/1942 | Briggs | 123—16 |
| 2,345,561 | 4/1944 | Allen | 123—16 |

MARK NEWMAN, Primary Examiner

ALLAN D. HERRMANN, Assistant Examiner